March 10, 1970 H. E. SCHMITZ ET AL 3,500,362

METHOD AND APPARATUS FOR ELIMINATING WOW AND FLUTTER

Filed Aug. 23, 1965 2 Sheets-Sheet 1

INVENTORS
HERBERT E. SCHMITZ
THOMAS E. WOODRUFF
BY
Willard R. Matthews, Jr.
ATTORNEY

METHOD AND APPARATUS FOR ELIMINATING WOW AND FLUTTER

Filed Aug. 23, 1965 2 Sheets-Sheet 2

INVENTORS
HERBERT E. SCHMITZ
THOMAS E. WOODRUFF
BY
Willard R. Matthews, Jr.
ATTORNEY United States Patent Office 3,500,362

Patented Mar. 10, 1970

3,500,362

METHOD AND APPARATUS FOR ELIMINATING WOW AND FLUTTER

Herbert E. Schmitz, Amherst, and Thomas E. Woodruff, Nashua, N.H., assignors to Sanders Associates, Inc., Nashua, N.H., a corporation of Delaware Filed Aug. 23, 1965, Ser. No. 481,652
Int. Cl. G11b *5/00*
U.S. Cl. 340—174.1 15 Claims

ABSTRACT OF THE DISCLOSURE

Apparatus and methods are disclosed for compensating for the effects of wow and flutter in a digital recording system by indexing the signal to be recorded with a first reference signal and subsequently establishing correct time intervals between digital pulses of the played-back signal by sequentially comparing pulses of the composite reproduced signal with a second reference signal.

This invention relates to data processing systems in which digital information is recorded and played back at a later time. In particular there are disclosed herein novel methods and apparatus adapted to compensate for the unwanted effects of so-called wow and flutter.

Recording devices such as tape recorders are subject to certain mechanical limitations which, to varying degrees, affect the fidelity of the played-back signal. Of particular significance in systems which use recording devices for the handling of digital information is the fact that the time increments between successive digital pulses can become varied due to these mechanical limitations. Certain mechanical limitations relating to the components of the recording device which position and control the movement of the recording medium are the source of recording errors referred to as wow and flutter. If the tape in a tape recorder traversed both the recording and playback heads at an absolutely constant speed and in an unvarying, fixed relationship thereto, the played-back signals would be identical to the recorded signals in both waveform and time-base relationship. However, any speeding up or slowing down of the drive motor will cause signal pulses to appear on the tape at shorter or longer intervals than the respective pulses of the original signal. This is a low-frequency variation and is identified as wow.

Another source of error is the fluttering or stringing effect of the tape because of its unsupported length. This has the effect of causing high-frequency perturbations which are commonly referred to as flutter. The effects of wow and flutter have in the past been partially compensated for by careful design requiring close tolerance in the manufacture of all mechanical parts. This approach, however, is very costly, and the resulting apparatus becomes bulky and heavy. In many applications in which space and weight economies are paramount, such an approach is not feasible. Another prior art approach to the solution of this problem is to provide servo speed regulation of the tape. Although this technique to some extent overcomes the effects of wow, the response times of known servo systems are incapable of compensating for pulse-to-pulse deviations. There are also applications where even the most expensive and carefully fabricated tape recorders are something less than satisfactory. For instance, where a signal is to be examined by a spectrum analyzer or narrow-band filter, even very slight discrepancies in the time base of arriving pulses are significant. In such a case it would be particularly desirable that the time base of the played-back pulse be made to coincide exactly to the time base of the initially recorded signal.

It is, of course, also desirable that a recording playback device suitable to accomplish this purpose would be compact, light-weight and inexpensive.

Accordingly, it is a principal object of the invention to provide improved methods and apparatus adapted to obviate the adverse effects of wow and flutter.

It is another object of this invention to provide novel electronic apparatus adapted to make the time base of the output signal of a tape recorded conform to the time base of the input signal.

It is another object of this invention to provide wow and flutter compensation apparatus that is less expensive than existing prior art devices.

It is another object of this invention to provide a novel method of compensating for the effects of wow and flutter in a tape recorded whereby a signal is combined with a first reference signal and recorded, and the pulses of the played-back composite signal are sequentially correlated with pulses of a second reference signal to establish a time base consistent with the time base of the original unrecorded signal.

It is another object of this invention to provide apparatus adapted to record and play back a digital signal which apparatus includes a wow and flutter compensating circuit suitable to correct pulse-to-pulse time increment errors of the played-back signal.

It is another object of this invention to provide apparatus of the type described, including novel circuits adapted to compensate for long-term shifting of the reproduced signal due to the cumulative effects of correcting similar time base errors between successive individual pulses.

It is another object of the invention to provide compact, light-weight wow and flutter compensation apparatus that is suitable for space and aircraft applications.

In order that all of the structural features for attaining these and other objects of the invention may be readily understood, reference is here made to the accompanying drawings, wherein.

Figure 1:
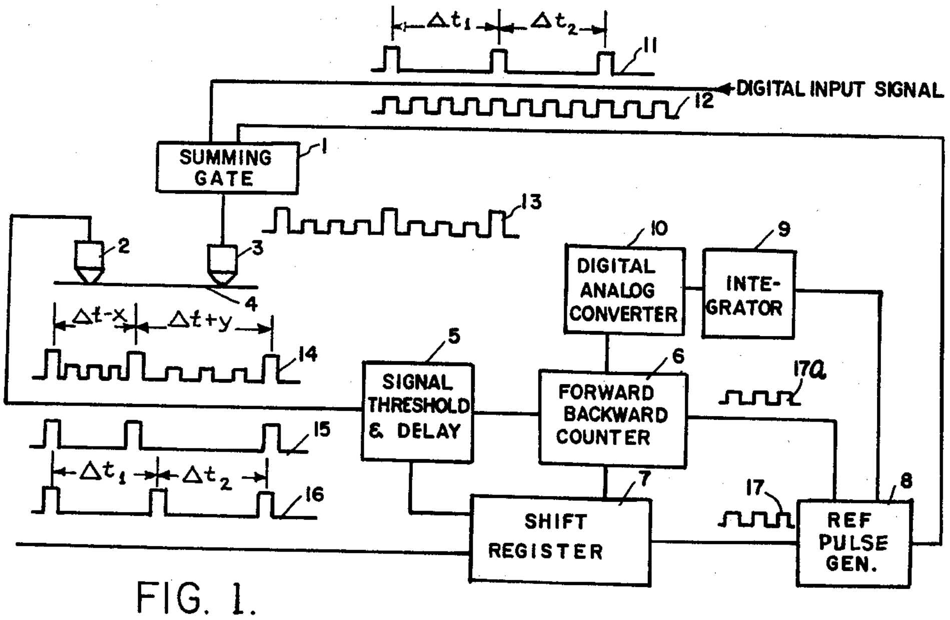
FIG. 1 is a block diagram showing the electrical connection and significance of the primary elements of one embodiment of the invention.

The present invention in its broadest concept comprehends indexing the digital signal to be recorded with a first reference pulse train and subsequently establishing correct time intervals between digital pulses of the played-back signal by sequentially comparing pulses of the composite reproduced signal with a second reference pulse train.

Considering the invention in some detail now, the digital input signal is preferably combined with a reference signal pulse train having a PRF of four or five times that of the input signal. The composite signal thus provided is recorded and played back in the conventional manner. The played-back composite signal will, of course, be reproduced in its proper pulse sequence; that is, the same number of reference pulses that resided between any two digital signal pulses in the input signal would also appear between the respective digital signal pulses of the output signal. However, the time increment between signal pulses may be appreciably altered by the effects of wow and flutter. Thus, while the reproduced signal will be a satisfactory reproduction of the recorded signal as far as arrival of sequential pulses is concerned, the overall signal may appear expanded or compressed because of the effects of wow and flutter. In accordance with the practice of the invention, such expansion and compression is compensated for by correlating the sequential pulses of the played-back composite signal with a second reference pulse train having the same PRF as said first reference pulse train. The correct real-time base for successive digital signal pulses in the composite signal is thus re-established. The digital information signal pulses are then written out according to this real-time base to provide an output signal that is substantially identical to the input signal.

One method of signal correlation comprehended by the invention includes the use of a forward-backward counter and a shift register. This arrangement employs a forward-backward counter which counts forward for each pulse of the incoming composite signal and backward for each pulse of the incoming second reference pulse train. At the same time, digital information pulses are detected from the incoming composite signal by a threshold detector, and are written into the shift register. Since the number of pulses and the sequential arrangement of such pulses in the composite signal are unaffected by the effects of wow and flutter, and since the PRF of both first and second reference pulse trains are identical, the comparison of the composite signal with the second reference pulse train may be on a pulse-for-pulse basis. The time-based distortion due to wow and flutter may cause either too many or too few composite signal pulses to be counted over any given period of time. If too many of the second reference pulse train pulses are counted between the arrival of consecutive digital information signal pulses, then the forward-backward counter will have counted to a minus number, say 2. This would indicate that this position of the signal had been expanded, or, stated another way, that the time increment between the digital information signal pulses had been made too long. In response to this minus count, the forward-backward counter functions to position the incoming digital information pulse in a position in the shift register closer to the preceding digital information pulse, thereby providing the correct time increment between output pulses. In the event that the composite signal has been compressed in time, the forward-backward counter will have counted to a plus number, and the incoming digital information signal pulse would be deposited in the shift register in a position further from the preceding digital information pulse. The forward-backward counter shift register arrangement effectively establishes correct output signal pulse to pulse time increments. However, it is apparent that if the errors compensated for are cumulative, that is, if incoming digital information signal pulses are continually being shifted in the same direction, then the limit of the shift register will eventually be reached, and the information will be lost. It is another feature of the invention to provide a compensating network suitable for eliminating this gradual shifting of the played-back signal pulse train due to the cumulative effect of pulse time interval corrections. Such a network may comprise a digital-to-analog converter in combination with an integrator whereby a voltage level is generated which represents the difference count of the forward-backward counter. This voltage level may be applied to the source of the second reference pulse train, causing it to either speed up or slow down the progress of digital information signals through the shift register. Although this may have the effect of slightly expanding or compressing the output of the shift register, such an expansion or compression would be so slight as to be of no significance in most applications.

An alternative method comprehended by the invention includes the use of a tape loop between the system signal reproducing means and the forward-backward counter. That is, the reproduced signal is recorded onto the tape loop and played back before being processed through the wow and flutter eliminating circuits. In this arrangement the voltage level established by the digital-to-analog converter and integrator is applied as a servo error signal to a motor which controls the speed of the tape loop. This has the effect of speeding up or slowing down the incoming signal to compensate for gradual shifting of the signal in the output register.

Referring now to FIG. 1, there is illustrated thereby a block diagram of apparatus which embodies the principles of the present invention. Although a specific circuit and particular components are referred to, it is to be understood that the same is by way of illustration only and is not to be taken in a limiting sense.

Summing gate 1 of FIG. 1 combines the digital input signal to be recorded and reproduced with a reference pulse train. Waveform 11 is illustrated as an example of such input signal. For convenience, this input signal has been illustrated as a periodic pulse train in which $\Delta t_1$ is equal to $\Delta t_2$ as illustrated. This of course may not always be the case; however, the principles of the invention are equally applicable to non-periodic signals. Waveform 12 illustrates the reference pulse train which, in accordance with the invention, is made to be periodic with a frequency of four times that of the input signal. Summing gate 1 combines these two signals in such a manner that some of the reference pulses coincide with the signal input pulses. The resultant waveform will appear as illustrated by waveform 13. The larger pulses in the waveform represent the digital signal pulses and will hereinafter be referred to as signal pulses. All other pulses are reference pulses and will be referred to as such. In the event that the digital input signal is not a periodic function, the signal pulses of pulse train 13 would have different amounts of reference pulses between successive signal pulses. Summing gate 1 would otherwise combine the two pulse trains in the same manner. The composite signal represented by waveform 13 is recorded and stored on a tape recorder, which includes tape 4, recording head 3, and playback head 2. When a signal is played back by the playback head 2, the output thereof may be distorted in time due to the effects of wow and flutter. A typical example of such distortion is illustrated by waveform 14, in which the waveform is at first expanded such that the time increment between the first two signal pulses has now become $\Delta t+y$, and the time increment between the second and third signal pulses has become $\Delta t-x$. In other respects, however, the waveform has been faithfully reproduced. The output of playback head 2 is applied to signal threshold detector and delay device 5. This device serves the function of differentiating between signal pulses and reference pulses. Such a device recognizes signal pulses as those pulses which exceed a particular threshold, and it directs these signal pulses directly to shift register 7. The signal threshold detector and delay device also passes the composite signal 14 after a brief delay to forward-backward counter 6. Reference pulse generator 8 supplies a second reference pulse train having the same PRF as reference pulse train 12 to the forward-backward counter 6. This reference signal, as applied to the forward-backwad counter 6, is illustrated by waveform **17*a* and may be supplied from the same source as reference pulse train 12. A reference pulse train which may be of the same PRF as reference signal 17*a* is also simultaneously applied to shift register 7. This last-mentioned reference pulse train is illustrated by waveform 17**.

Operation of the wow and flutter compensation circuit comprising signal threshold detector and delay device 5 and reference pulse generator 8 will now be described in detail. Signal threshold detector and delay device 5 directs the first appearing signal pulse of waveform 14 to shift register 7, wherein it is registered in a position near the center of the register. Waveform 15 illustrates such a train of signal pulses as they are detected by the signal threshold detector and delivered thereby to the shift register 7. The composite signal as represented by waveform 14 is, after a brief delay, applied to forward-backward counter 6; and each pulse beginning with the signal pulse already recorded in shift register 7 is counted in a forward manner. Reference pulses from reference pulse generator 8 (represented by waveform 17*a*) are also applied to forward-backward counter 6 and cause the counter to count backwards with each arriving reference pulse. At the same time, the signal pulse that was initially applied to shift register 7 is being shifted to the left in response to the reference signal from reference pulse generator 8 (illustrated by waveform 17). In the illustration of FIG. 1, the second signal pulse of waveform 14, because of the time base distortion, would appear in the shift register 7 at a time later than that required to faithfully reproduce the initial unrecorded signal. However, because of this greater time lapse between the first and second signal pulses, the forward-backward counter will have counted backward one more count than it had counted forward. This has the effect of positioning the second incoming signal pulse one position to the left of the position in the shift register that was formerly occupied by the first signal pulse. The time relationship between these two signal pulses as they reside in the shift register has thus been made to coincide with the original unrecorded signal pulses. The third digital information pulse in the example of FIG. 1 will appear at the shift register 7 at a point in time too early to be a true representation of the original signal. The compensation is again made in the forward-backward counter 6 as above described. In this instance, however, the forward-backward counter has counted forward one more unit than it has counted backward and the pulse is positioned in the shift register 7 one position to the right of the preceding pulse. The output of the shift register 7 therefore comprises a series of signal pulses spaced at time intervals determined by the above-rescribed process. Such pulses are continually shifted to the left at a uniform rate by reference signal 17. They appear at the shift register output as a reproduction of the original signal having a waveform as illustrated by waveform 16.

Figure 3:
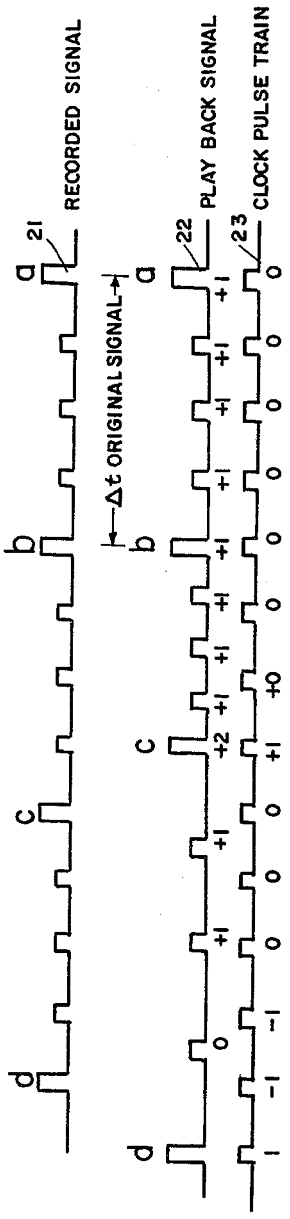
FIG. 3 illustrates typical waveforms as they appear in various stages of the apparatus of FIG. 1.
Figure 4:
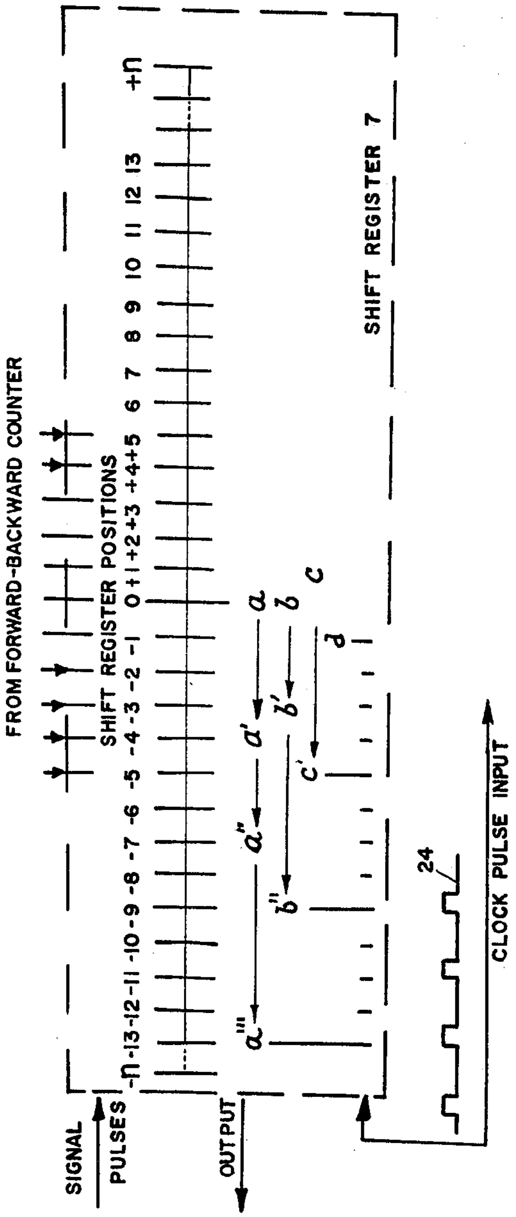
FIG. 4 illustrates the pulse input position mechanism of the shift register of FIG. 1.

The operation of forward-backward counter 6 and shift register 7 will be more readily understood from the following discussion of their combined functions. Reference is made to FIGS. 3 and 4. FIG. 3 presents typical waveforms as they would appear before recording (waveform 21) and in the forward-backward counter (waveforms 22, 23 and 24). FIG. 4 illustrates the signal input position stage of the shift register 7. Waveform 21 represents a composite signal to be recorded over a span of four consecutive signal pulses. Waveform 22 illustrates the played-back version of signal 21 in which there has been no distortion between the first two signal pulses *a* and *b*, and compression and expansion distortion, respectively, between digital information pulses *b* and *c*, and *c* and *d*.

The handling of the signal train represented by waveform 22 by the forward-backward counter and shift register will now be considered. Signal pulse *a* of waveform 22, being first in time to arrive at signal threshold detector and delay device 5 is recorded in shift register 7 at position zero. After a short delay, pulse *a* of waveform 22 then causes forward-backward counter 6 to count in a positive direction, that is, it counts from zero to plus one. The reference signal train represented by waveform 23 is also applied to forward-backward counter 6 and the first arriving pulse thereof causes the forward-backward counter to count back to zero. The next arriving pulse in waveform 22 (the reference pulse following signal pulse *a*) causes the counter to count back to plus one, and the next arriving pulse of waveform 23 causes it to count back to zero. This forward and backward counting continues for the three reference pulses residing between signal pulses *a* and *b* of waveform 22. When signal pulse *b* arrives, the forward-backward counter has counted back to zero, and pulse *b* is positioned in shift register 7 at position zero, as was the first appearing pulse *a*. During this counting operation, the reference pulse input train represented by waveform 24 had been in the process of shifting signal pulse *a* from the zero position in the shift register to the position −4. This is indicated in FIG. 4 by the notation *a'*. The forward-backward counter in this particular instance counted back to zero because there had been no distortion in that portion of the signal and signal pulse *a* had been shifted in the shift register the proper amount such that signal pulse *b* would be positioned properly at position zero in order to provide the correct time increment between pulses. It is apparent from an examination of waveform 22 that the next portion thereof is distorted to cause the time increment between signal pulses *b* and *c* to be less than it was in the original signal. In the forward-backward counter such distortion causes the counter to count to plus one at the time of arrival of signal pulse *c* at the shift register. Signal pulse *c* is therefore positioned at position +1 in the shift register. During this counting operation, signal pulse *a* has moved to the position noted as *a''* or position −7 in the shift register, and signal pulse *b* has moved to the position *b'*, or position −3 in the shift register. Therefore, signal pulse *c*, by being initially positioned in position +1, is correctly positioned four units in time behind signal pulse *b* and eight units in time behind signal pulse *a*. Finally, it will be noted from an examination of waveform 22 that signal pulse *d* will arrive after a substantially longer time increment than the time increment between signal pulses *b* and *c*. In this situation, forward-backward counter 6 counts from +1 back to −1 by the time signal pulse *d* appears at shift register 7. However, during this extended time, signal pulses *a*, *b* and *c* have been shifted six time positions to the left in the shift register. The shift register, having now counted to −1, causes signal pulse *d* to be positioned in shift register 7 at position −1. Signal pulse *d* is therefore correctly positioned four time units behind signal pulse *c*, eight time units behind signal pulse *b*, and twelve time units behind signal pulse *a*, as indicated in FIG. 4 by the notations *a'''*, *b''*, *c'* and *d*. Inasmuch as the signal pulses in the shift register are being shifted at a uniform periodic rate by reference pulses that are related to the time base of the original recorded signal, each advance position in the shift register is herein considered as a time unit. It is apparent from the foregoing description of the operation of the forward-backward counter and shift register that any time base distortion of successive pulses of the played-back signal will be automatically corrected.

In the above-described example, the three possible situations that might exist have been discussed. That is, the conditions of no time distortion, compressed time distortion and expanded time distortion have been illustrated, and the manner in which the forward-backward counter and shift register responds to these conditions has been expounded.

Figure 2:
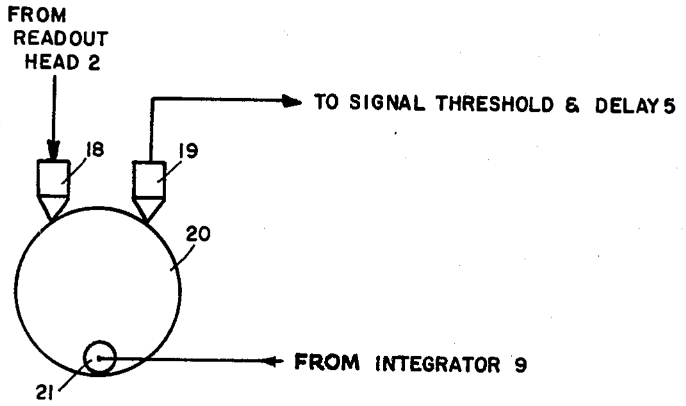
FIG. 2 is a schematic representation of a feature of the invention which obviates long-term shifting of the played-back signal in the output register.

Since the example used in this exposition considered the case in which both expanded and contracted time errors were present, no appreciable overall shift of the signals recorded in the shift register developed. It is quite possible, however, that the time base errors due to wow and flutter may result in either predominantly compressed signals or predominantly expanded signals. Should this be the case, it is apparent that the incoming signal pulses would be positioned further and further towards one side of the shift register or the other. For example, had signal pulse *d* of waveform 22 appear closer to signal pulse *c*, then the forward-backward counter would have counted in the plus direction from the +1 position, and signal pulse *d* would have been positioned at position +2 or +3. If compression distortion continued throughout a long signal, successive pulses would be positioned in shift register 7 at positions +4, +5, +6, and up to +*n*, after which further incoming signal pulses would be lost. In order to compensate for this undesirable effect, a compensating circuit comprising the digital analog converter 10 and integrator 9 illustrated in FIG. 1, has been provided. This circuit, as indicated above, provides a voltage signal responsive to the excess count of forward-backward counter 6. This signal may be applied to reference pulse generator 8 to speed up or slow down the rate at which the pulse train of waveform 24 shifts the signals through shift register 7. Therefore, if the time base corrections of forward-backward counter 6 were consistently for compressed signals causing new incoming signals to be positioned further and further to the right in shift register 7, then the signal from integrator 9 would cause refence pulse generator 8 to speed the transport of signals through the shift register, thereby keeping approximately half of the shift register available for incoming signals. The signal developed by digital analog converter 10 and integrator 9 may alternatively be used to control the speed at which the played-back signal 22 is delivered to signal threshold detector and delay device 5. This is accomplished by the use of a tape loop as illustrated in FIG. 2. Such a tape loop is positioned between readout head 2 and signal threshold detector and delay device 5. This tape loop is in effect a second tape recorder in which recording head 18 records the output from readout head 2 into the small tape loop 20 and the signal thus recorded is read out by readout head 19. This signal is thereafter applied to the signal threshold detector and delay device 5. The signal from digital analog converter 10 and integrator 9 in this alternate arrangement is used as a servo control signal and controls the rate at which tape transport motor 21 moves tape 20. It is apparent that by controlling the speed of tape 20 the time increments between pulses recorded thereon can also be controlled. In this manner, the signal from digital analog converter 10 and integrator 9 is used to compensate for long-term shifting of the overall signal due to the cumulative effect of correcting similar errors between successive individual pulses.

The corrections provided by such a tape loop, of course, cannot continue indefinitely if the error is always in the same direction. Eventually the tape loop will reach its capacity and begin to lose information.

In the event that the signal being processed has previously been recorded on tape, the output of the apparatus can be absolutely free of wow and flutter for indefinite periods of time. This is accomplished by using the error signal output of integrator 9 to control the speed at which the previously recorded signal is delivered to summing gate 1 of FIG. 1.

It is to be understood that the above-described arrangements are illustrative of the applications of the principles of this invention. Numerous other arrangements may be devised by those skilled in the art without departing from the scope of the invention.

Having thus described the invention, what is claimed as new and desired to be secured by Letters Patent is:

1. In a system for recording and playing back digital signals, a wow and flutter compensation device, comprising, in combination with recording and playback apparatus, means for providing first and second periodic reference signals, means for indexing the signal to be recorded with said first periodic reference signal, an output register, means for effecting time correlation of the played-back composite signal and said second periodic reference signal, and means for positioning in response thereto in said output register played-back digital signal pulses.

2. Apparatus for recording and playing back digital signals comprising: means for providing first and second periodic reference signals, means for summing the digital signal to be recorded with said first reference signal to provide a composite signal, recording means adapted to receive and record said composite signal, playback means in operative relationship with said recording means and adapted to reproduce said composite signal, means for effecting time correlation of said reproduced composite signal and said second reference signal, an output register, and means for sequentially delivering to said output register the digital signal pulses contained in said reproduced composite signal at time intervals consistent with the real time base of said correlated signals.

3. A compensating circuit for eliminating time base distortion of a recorded digital signal comprising, in combination with a tape recorder, means for providing a first periodic reference signal, signal summing means associated therewith for summing a digital signal to be recorded with said first reference signal, said summing means having an output in communication with said tape recorder to effect recording of the composite signal developed therein, a playback device associated with said tape recorder, means in signal receiving relationship with the output of said playback device for generating a duplicate signal pulse for each signal pulse of said composite signal, a shift register, means for delivering said duplicate pulse to said shift register, a forward-backward counter, signal delay means, means for delivering said composite signal therethrough to said forward-backward counter, means for providing second and third periodic reference signals having the same PRF as said first reference signal, and means for delivering said second reference signal to said forward-backward counter and said third reference signal to said shift register.

4. In a system for recording and playing back a digital signal, the method of correcting time base errors in the output signal thereof, comprising the steps of: combining the digital signal to be recorded with a periodic reference signal, recording the composite signal thereby obtained, playing back said composite signal, and establishing a time base relationship between played-back digital signal pulses by the correlation of a periodic reference signal and said played-back composite signal.

5. The method of recording and playing back a digital signal, comprising the steps of indexing said digital signal with a first train of periodic reference pulses, recording the composite signal, playing back said composite signal, and sequentially passing the signal pulses of the played-back composite signal through a delay device at time increments determined by correlation of said composite signal with a second train of periodic reference pulses.

6. The method of eliminating the effects of wow and flutter in a tape recorder adapted to record and play back digital signals comprising the steps of: summing a digital signal and a periodic reference signal to produce a composite signal, recording said composite signal on a tape recorder, playing back said composite signal, effecting time coincidence of consecutive pulses of said composite signal with consecutive pulses of a reference signal pulse train to re-establish the digital signal pulse-to-pulse time increments of the original unrecorded digital signal, and sequentially writing into an output shift register the digital signal pulses of said composite signal at said re-established time increments.

7. A wow and flutter compensating device as defined in claim 1, including an output signal drift correction network adapted to eliminate the gradual shift of the played-back signal pulse train in said output register due to cumulative effects of signal pulse time interval corrections.

8. Apparatus as defined in claim 2, including an output signal drift correction network adapted to eliminate the gradual shift of the played-back signal pulse train in said output register due to cumulative effects of signal pulse time interval corrections.

9. A compensating circuit as defined in claim 3 including a digital-to-analog converter, said digital-to-analog converter being interconnected with said forward-backward counter and adapted to convert excess count digital pulses therefrom into an analog voltage, and means for effecting control of said third reference signal in response to said integrated analog voltage.

10. A compensating circuit as defined in claim 3, including a recording tape loop having a tape transport motor associated therewith, recording and playback devices adapted respectively to record the output composite signal of said tape recorder onto said tape loop and play back the content thereof to said means for generating duplicate signal pulses, a digital-to-analog converter, said digital-to-analog converter being interconnected with said forward-backward counter and adapted to convert excess count digital pulses therefrom into an analog voltage, means for integrating said analog voltage, and means for effecting control of said tape transport motor in response to said integrated analog voltage.

11. The method of claim 6 including the further step of controlling the rate of transport of the digital signal pulse train through said output shift register in response to a voltage proportional to digital output signal shifts resulting from the correlation of non-coincident portions of said composite signal and said reference signal pulse train.

12. The method of claim 6 including the further step of controlling the playback rate of said composite signal in response to a voltage proportional to digital output signal shift resulting from the correlation of non-coincident portions of said composite signal and said reference signal pulse train.

13. A wow and flutter device as defined in claim 1 wherein said means for providing first and second periodic reference signals is adapted to provide reference signals having a PRF of at least four times the PRF of the digital signal to be recorded.

14. Wow and flutter eliminating apparatus comprising: a summing gate having first and second signal inputs and an output, a reference signal generator, a tape recorder including a recording head, readout head and a magnetic storage tape, said summing gate output being connected to said tape recorder recording head, said first summing gate input being connected to a source of digital input signals and said second summing gate input being connected to said reference signal generator, a signal threshold detector, a shift register, said signal threshold detector being connected to said tape recorder readout head and said shift register, a signal delay device, a forward-backward counter, said signal delay device being connected to said tape recorder readout head and said forward-backward counter, said reference signal generator being connected to said shift register and to said forward-backward counter, said forward-backward counter being connected to said shift register, a digital analog converter and an integrator, said digital analog converter and said integrator being connected in series between said forward-backward counter and said reference signal generator.

15. A circuit adapted to eliminate the effects of time base distortion due to wow and flutter in a tape recorder comprising: a first tape recorder having a recording head, a readout head and a magnetic tape; a digital input signal source, a periodic reference signal source, a signal summing device having first and second input means and an output means, said first input means being connected to said digital input signal source, said second input means being connected to said periodic reference signal source, and said output means being connected to said first tape recorder recording head; a second tape recorder comprising a recording head, a readout head, a magnetic tape loop and a tape loop transport motor, a signal threshold detector, a signal delay device, said second tape recorder recording head being connected to the output of said first tape recorder readout head, said second tape recorder readout head being connected to said signal threshold detector and said delay device; a shift register, a forward-backward counter, said shift register being connected to said signal threshold detector, said forward-backward counter and said periodic reference signal source, said forward-backward counter being connected to said delay device and said periodic reference signal source; a digital analog converter and an integrator, said digital analog converter being connected in series between said forward-backward counter and the tape loop transport motor of said second tape recorder.

References Cited

UNITED STATES PATENTS

| | | | |
|---|---|---|---|
| 2,892,022 | 6/1959 | Houghton | 340—174.1 |
| 2,937,366 | 5/1960 | Sims | 340—174.1 |
| 2,991,452 | 7/1961 | Welsh | 340—174.1 |
| 3,103,000 | 9/1963 | Newman | 340—174.1 |
| 3,217,329 | 11/1965 | Gabor | 340—174.1 |
| 3,141,926 | 7/1964 | Newell | 179—100.2 |
| 2,960,568 | 11/1960 | Leyton | 179—100.2 |
| 3,202,769 | 8/1965 | Coleman | 179—100.2 |

JAMES W. MOFFITT, Primary Examiner

VINCENT P. CANNEY, Assistant Examiner